United States Patent
Yu et al.

(10) Patent No.: US 11,243,086 B2
(45) Date of Patent: Feb. 8, 2022

(54) METHOD, DEVICE AND APPARATUS FOR ACQUIRING MAP, AND COMPUTER READABLE STORAGE MEDIUM

(71) Applicant: BAIDU ONLINE NETWORK TECHNOLOGY (BEIJING) CO., LTD., Beijing (CN)

(72) Inventors: Li Yu, Beijing (CN); Shiyu Song, Beijing (CN); Fangfang Dong, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 83 days.

(21) Appl. No.: 16/502,368

(22) Filed: Jul. 3, 2019

(65) Prior Publication Data
US 2020/0011675 A1    Jan. 9, 2020

(30) Foreign Application Priority Data
Jul. 4, 2018  (CN) .......................... 201810724857.6

(51) Int. Cl.
*G01C 21/32*    (2006.01)

(52) U.S. Cl.
CPC .................................. *G01C 21/32* (2013.01)

(58) Field of Classification Search
CPC .. G01C 21/32; G01C 21/304; G01C 21/3815; G01C 21/3819; G01C 21/3841; G01C 21/3859; G01C 21/3867; G01C 21/3881; G01C 21/3896; G09B 29/005
See application file for complete search history.

(56) References Cited

U.S. PATENT DOCUMENTS

| 2008/0086262 A1* | 4/2008 | Asahara ................. G01C 21/32 |
| | | 701/452 |
| 2017/0248963 A1* | 8/2017 | Levinson ............... B60W 30/09 |
| 2018/0189323 A1* | 7/2018 | Wheeler ................ G01C 21/32 |

FOREIGN PATENT DOCUMENTS

| CN | 102012232 A | 4/2011 |
| CN | 102016501 A | 4/2011 |
| CN | 103473293 A | 12/2013 |
| CN | 103635779 A | 3/2014 |
| CN | 104281709 A | 1/2015 |

(Continued)

OTHER PUBLICATIONS

Chinese Patent Application No. 201810724857.6 Office Action dated Apr. 1, 2020, 10 pages.

(Continued)

*Primary Examiner* — Jelani A Smith
*Assistant Examiner* — Hana Lee
(74) *Attorney, Agent, or Firm* — Lathrop GPM LLP (57) ABSTRACT

Embodiments of the present disclosure provide a method and a device for acquiring a map, a device, and a computer readable storage medium. The method includes: acquiring a reference map of an acquisition area; dividing the acquisition area into a plurality of sub-areas based on the reference map; generating a plurality of acquisition tasks corresponding to the plurality of sub-areas, wherein each of the plurality of acquisition tasks is configured to acquire a map of each of the plurality of sub-areas; and assigning each of the plurality of acquisition tasks to an acquisition entity, to enable the acquisition entity to acquire the map of each of the plurality of sub-areas.

16 Claims, 7 Drawing Sheets

(56) References Cited

FOREIGN PATENT DOCUMENTS

| CN | 104658039 | A | | 5/2015 | | |
|---|---|---|---|---|---|---|
| CN | 105022405 | A | | 11/2015 | | |
| CN | 105188131 | A | | 12/2015 | | |
| CN | 105225604 | A | | 1/2016 | | |
| CN | 105448184 | A | | 3/2016 | | |
| CN | 105628034 | A | | 6/2016 | | |
| CN | 106017490 | A | | 10/2016 | | |
| CN | 106595682 | A | | 4/2017 | | |
| CN | 106802655 | A | | 6/2017 | | |
| CN | 106969763 | A | | 7/2017 | | |
| CN | 106971683 | A | | 7/2017 | | |
| CN | 106971683 | A | * | 7/2017 | | |
| CN | 106980657 | A | | 7/2017 | | |
| CN | 106980657 | A | * | 7/2017 | | |
| CN | 107063273 | A | | 8/2017 | | |
| CN | 107466469 | A | | 12/2017 | | |
| CN | 107466469 | A | * | 12/2017 | ............. | H04L 67/10 |
| CN | 107609080 | A | | 1/2018 | | |
| CN | 107798720 | A | | 3/2018 | | |
| CN | 107820610 | A | | 3/2018 | | |
| CN | 108225348 | A | | 6/2018 | | |
| JP | 2004226730 | A | * | 8/2004 | ............. | G01C 21/32 |
| WO | WO-2007094371 | A1 | * | 8/2007 | ............. | G01C 21/32 |
| WO | WO-2014052969 | A1 | * | 4/2014 | ............. | H04W 4/021 |
| WO | WO-2016116070 | A2 | * | 7/2016 | ............. | G06M 11/00 |

OTHER PUBLICATIONS

Chinese Patent Application No. 201810724857.6 English translation of Office Action dated Apr. 1, 2020, 12 pages.
Chinese Patent Application No. 201810724857.6 Office Action dated Mar. 29, 2021, 12 pages.
Chinese Patent Application No. 201810724857.6 English translation of Office Action dated Mar. 29, 2021, 10 pages.

* cited by examiner

METHOD, DEVICE AND APPARATUS FOR ACQUIRING MAP, AND COMPUTER READABLE STORAGE MEDIUM

CROSS-REFERENCE TO RELATED APPLICATIONS

This application claims priority to and benefits of Chinese Patent Application No. 201810724857.6, filed with the National Intellectual Property Administration of P. R. China on Jul. 4, 2018, the entire contents of which are incorporated herein by reference.

TECHNICAL FIELD

Embodiments of the present disclosure generally relate to the field of maps, and more particularly, to a method for acquiring a map, a device for acquiring a map, a device, and a computer readable storage medium.

BACKGROUND

The high-precision map plays an important role in autonomous driving systems. In the autonomous driving system, whether it is perception, path planning or positioning system, it relies highly on the high-precision map. With the high-precision map, the autonomous driving system can have different perspectives, and can have the capacity to accurately understand the circumstances, thereby releasing system performance and extending sensor detection boundaries. The accuracy of the high-precision map affects the performance of unmanned driving. Therefore, high-precision map is one of the core technologies of the autonomous driving system.

In order to make the map consistent with the real environment, it is necessary to constantly acquire new data to update the map. With the increasing application scenarios of autonomous driving, it is an urgent problem to produce the large-scale and high-precision map with centimeter-level accuracy at low cost.

SUMMARY

The present disclosure provides a method for acquiring a map. The method may be applicable to a server, and the method includes: acquiring a reference map of an acquisition area; dividing the acquisition area into a plurality of sub-areas based on the reference map; generating a plurality of acquisition tasks corresponding to the plurality of sub-areas, wherein each of the plurality of acquisition tasks is configured to acquire a map of each of the plurality of sub-areas; and assigning each of the plurality of acquisition tasks to an acquisition entity, to enable the acquisition entity to acquire the map of each of the plurality of sub-areas.

The present disclosure provides a device for acquiring a map. The device includes one or more processors and a memory. The memory is configured to store one or more programs. When the one or more programs are executed by the one or more processors, causes the one or more processors to: acquire a reference map of an acquisition area; divide the acquisition area into a plurality of sub-areas based on the reference map; generate a plurality of acquisition tasks corresponding to the plurality of sub-areas, wherein each of the plurality of acquisition tasks is configured to acquire a map of each of the plurality of sub-areas; and assign each of the plurality of acquisition tasks to an acquisition entity, to enable the acquisition entity to acquire the map of each of the plurality of sub-areas.

The present disclosure provides a device for acquiring a map. The device includes one or more processors and a memory. The memory is configured to store one or more programs. When the one or more programs are executed by the one or more processors, causes the one or more processors to: acquire an acquisition task assigned to the acquisition entity from a server, wherein an acquisition area is divided into a plurality of sub-areas, and the acquisition task is configured to instruct the acquisition entity to acquire a map of a sub-area of the plurality of sub-areas; determine whether the acquisition entity is within the sub-area; acquire the map of the sub-area in response to determining that the acquisition entity is within the sub-area; and send the map of the sub-area to the server.

The present disclosure provides a computer readable storage medium stored thereon with computer programs. When the computer programs are executed by a processor, the method according to embodiments of the present disclosure is implemented.

The present disclosure provides a computer readable storage medium stored thereon with computer programs. When the computer programs are executed by a processor, the method according to embodiments of the present disclosure is implemented.

It is to be understood that both the foregoing general description and the following detailed description are exemplary and explanatory only and are not restrictive of the present disclosure. Other features of the present disclosure will be understood by the following description.

BRIEF DESCRIPTION OF THE DRAWINGS

These and other aspects and advantages of embodiments of the present disclosure will become apparent and more readily appreciated from the following descriptions made with reference to the accompanying drawings. In the drawings, the same or similar reference numerals indicate the same or similar elements, in which.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

In the description of the embodiments of the present disclosure, the term "including" and the like are to be understood as open inclusion, i.e., "including but not limited to". The term "based on" should be understood as "based at least in part". The term "one embodiment" or "an embodiment" should be understood as "at least one embodiment". The terms "first", "second" and the like may refer to different or identical objects. Other explicit and implicit definitions may also be included below.

As mentioned above, with the increasing application scenarios of autonomous driving, the generation of the large-scale and high-precision map with centimeter-level accuracy at low cost brings a large challenge to accuracy, efficiency, computing power, and resource cost.

At present, it mainly relies on the high-precision positioning results provided by the integrated navigation system based on the Global Navigation Satellite System/Inertial Navigation System (GNSS/SINS) to construct the map. However, this mode is generally suitable for the generation of the small-scale map, and cannot be adapted to the generation of the large-scale map. For example, for a city, it usually contains various complex scenes, such as the park with shady roads, the tunnel, the high-rise area, and the like. In the scenario, due to the weak global positioning system (GPS) signal and multipath effect, the positioning technology in the related art cannot meet the requirements of stable high-precision positioning and mapping accuracy. In addition, for mapping schemes based on the integrated navigation system (GNSS/SINS), the collected map data usually includes a large amount of low-precision noise, which cannot be used to produce centimeter-level accuracy maps that meet the requirements of driverless driving.

According to embodiments of the present disclosure, there is provided a method for acquiring a map, which can achieve production of the low-cost and high-precision map by using the crowdsourcing mode. It is recognized that, even with crowdsourcing mode for data acquisition on large-scale urban roads, it may still be difficult to control the quality of the acquired data due to the difficulty in dividing the acquisition tasks. Moreover, it is further recognized that, the acquisition entities (e.g., acquisition vehicles) generally have limited storage space and limited transmission bandwidth, such that it does not allow all the data collected during the acquisition process to be stored, nor does it allow direct transmission of the acquired raw data to the server for map production. With the embodiment of the present disclosure, the redundant data can be removed from the massively collected data, and necessary data can be stored. In addition, the solution can utilize the limited resources at the acquisition entity for map production, thereby reducing the occupation of the transmission bandwidth between the acquisition entity and the server, and improving map production efficiency.

Embodiments of the present disclosure will be described below with reference to the drawings.

Figure 1:
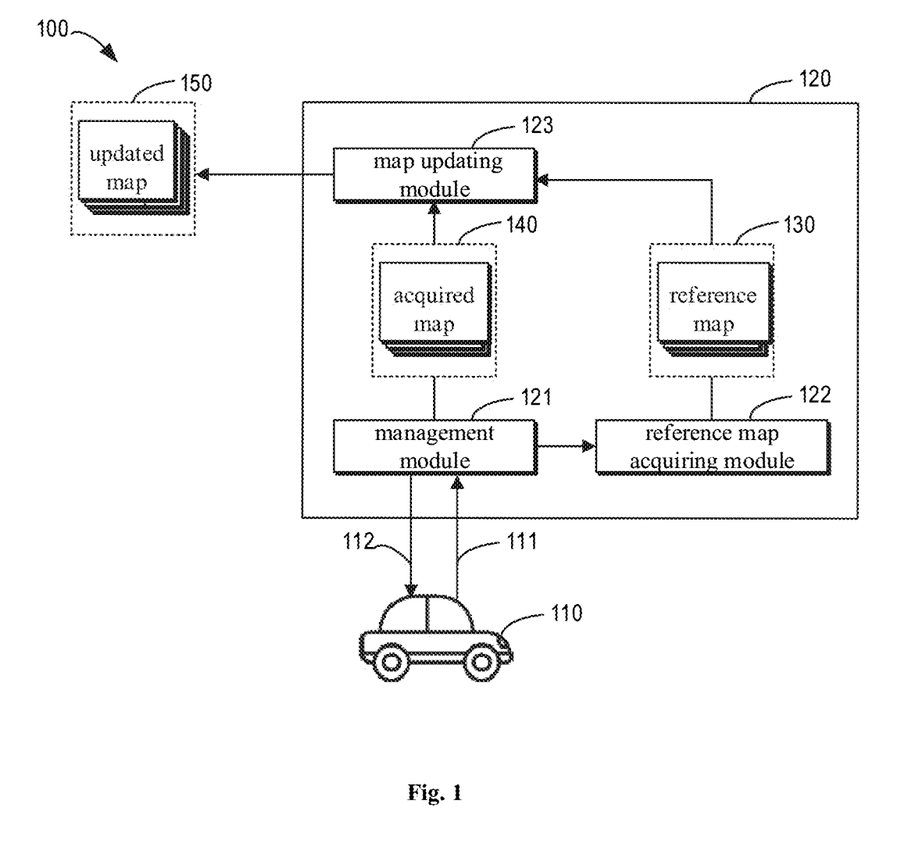
FIG. 1 is a schematic diagram of an environment in which an embodiment of the present disclosure is implemented.

FIG. 1 is a schematic diagram of an example environment 100 in which an embodiment of the present disclosure can be implemented. The environment 100 may generally include one or more acquisition entities 110 and the server 120. It should be understood that, the structure and function of the environment 100 shown in FIG. 1 are described for exemplary purposes only, without implying any limitation to the scope of the present disclosure. Embodiments of the present disclosure may also be applicable to environments having different structures and/or functions. For the sake of simplicity, only one acquisition entity 110 is shown in FIG. 1, embodiments of the present disclosure may also be applicable to the case of multiple acquisition entities.

The "acquisition entity" described herein may refer to the device capable of acquiring data. Examples of the acquisition entity may include, but is not limited to, the acquisition vehicle or other devices for acquiring data. For example, one or more sensors (not shown) may be mounted on the acquisition entity 110 to acquire data, examples of which include, but are not limited to, lidars, cameras, GPS positioning modules, and other sensor devices. The "server" described herein can be deployed, for example, on a single device or in the form of a cloud computing architecture. For example, when server 120 is deployed in the form of the cloud computing architecture, part or all of the various components therein may be deployed remotely, and can work together to implement the function of the server 120.

As shown in FIG. 1, the server 120 may include, for example, a management module 121, a reference map acquiring module 122, and a map updating module 123.

In at least one embodiment, the reference map acquiring module 122 may be configured to acquire the reference map of an acquisition area. The acquisition area refers to an area for which a map is to be made, such as a city. In the initial case, the reference map may be generated based on data collected by the acquisition entity (e.g., one acquisition entity of the plurality of acquisition entities 110) within the acquisition area. For example, the acquisition entity may utilize the sensor (e.g., lidar) mounted thereon to acquire data (e.g., point cloud data) for mapping in the acquisition area, and upload the acquired raw data to the management module 121 in the server 120. The management module 121 is configured to manage the acquisition task issued to each acquisition entity 110 and the execution result the acquisition task received from the acquisition entity. The reference map acquiring module 122 may obtain data from the management module 121, and generate the reference map 130 for the acquisition area based on the data. For example, the reference map 130 may serve as the basis for crowdsourced map production. Although it is shown in FIG. 1 that, the reference map 130 is generated by the server 120, in at least one embodiment, the reference map 130 may also be obtained from other sources.

In at least one embodiment, the management module 121 may be configured to manage the acquisition task issued to each acquisition entity 110 and the execution result the acquisition task received from the acquisition entity. In an embodiment, the management module 121 can, for example, divide the acquisition area into a plurality of sub-areas based on the reference map 130 and generate a plurality of acquisition tasks corresponding to the plurality of sub-areas. For example, each of the plurality of acquisition tasks is configured to acquire a map of each of the plurality of sub-areas. The management module 121 can assign the plurality of acquisition tasks to the plurality of acquisition entities. For example, the management module 121 may assign the acquisition task to the acquisition entity 110 via the delivery channel 112, so that the acquisition entity 110 acquires the map of each of the plurality of sub-areas.

In at least one embodiment, the acquisition entity 110 can receive the acquisition task from the server via the delivery channel 112. For example, the acquisition task may instruct the acquisition entity 110 to acquire the map of each of the plurality of sub-areas. In response to receiving the acquisition task, the acquisition entity 110 may determine whether it is within the sub-area specified by the acquisition task. In response to determining that it is within the sub-area specified by the acquisition task, the acquisition entity 110 may acquire the data (e.g., point cloud data acquired using lidar) for map production within the sub-area during the acquisition period (e.g., daylight), and store the acquired data. Then, the acquisition entity 110 can generate the map of the acquisition area based on the stored data at an appropriate time (e.g., at night). The acquisition entity 110 may further verify the accuracy of the generated map, and send the map satisfying the accuracy requirement to the server 120 via the upload channel 111, such that the server can perform map conflation and update based on map data from different acquisition entities 110.

In at least one embodiment, the management module 121 in the server 120 may receive the map 140 of the sub-area obtained by completing the acquisition task via the upload channel 111. The management module 121 may send the map 140 received from each acquisition entity to the map updating module 123 for map conflation and update.

In at least one embodiment, the map updating module 123 can perform map conflation and update in a preset period, such as once a week. For example, the map updating module 123 may update the reference map 130 of the acquisition area based on the map 140 acquired by the acquisition entity 110, so as to obtain the updated map 150 of the acquisition area. The updated map 150 can serve as the basis for the next map updating performed by the map updating module 123.

The operating principle of the acquisition entity 110 and the server 120 shown in FIG. 1 will be described in detail below with reference to the accompanying drawings.

Figure 2:
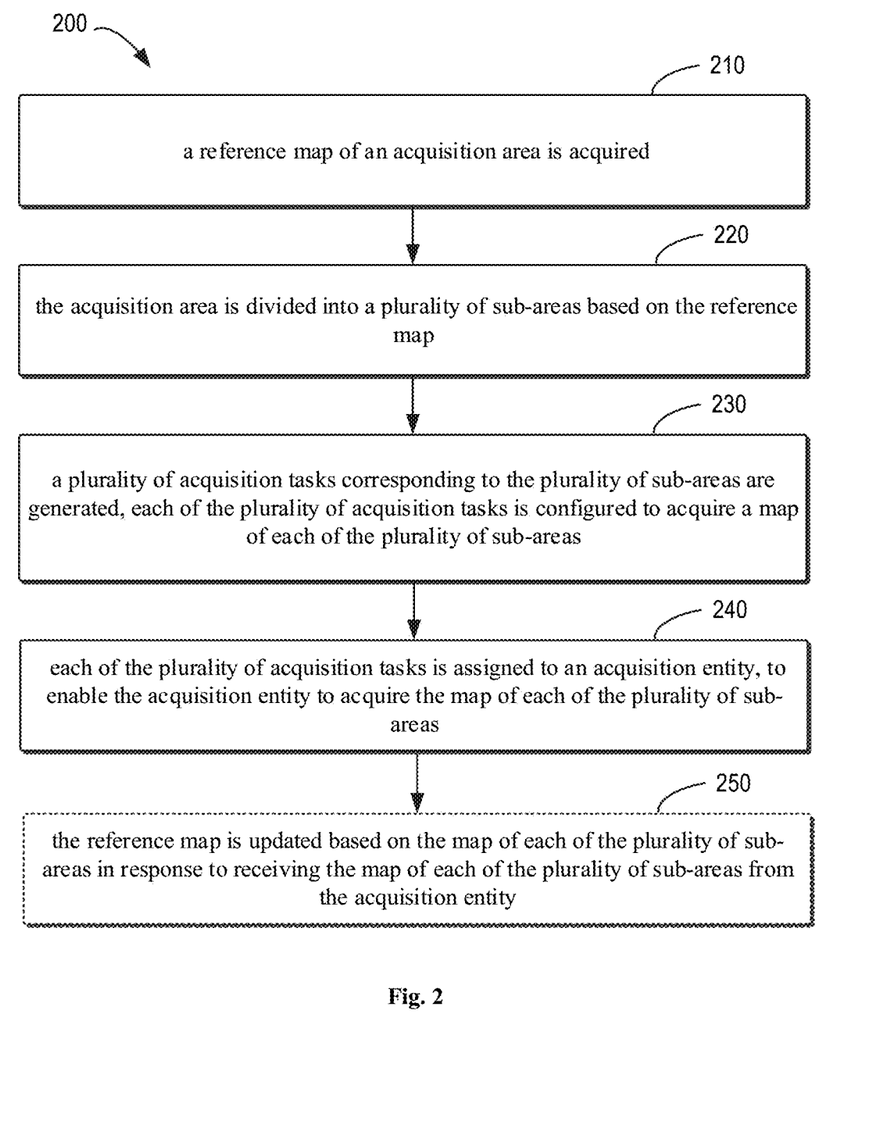
FIG. 2 is a flow chart of a method for acquiring a map according to an embodiment of the present disclosure.

FIG. 2 is a flow chart of a method 200 for acquiring a map according to an embodiment of the present disclosure. For example, the method 200 may be performed by the server 120 shown in FIG. 1. The various acts of the method 200 will be described in detail below with reference to FIG. 1. It should be understood that, the method 200 may also include additional acts not shown and/or acts that can be omitted, the scope of the present disclosure is not limited.

At block 210, the server 210 (e.g., the reference map acquiring module 122) acquires a reference map of an acquisition area.

The acquisition area refers to an area for which a map is to be made, such as a city. In the initial case, the reference map may be generated based on data collected by the acquisition entity (e.g., one acquisition entity of the plurality of acquisition entities 110) within the acquisition area. For example, the acquisition entity may utilize the sensor (e.g., lidar) mounted thereon to acquire data (e.g., point cloud data) for mapping in the acquisition area, and upload the acquired raw data to the management module 121 (which is configured to manage the acquisition task issued to each acquisition entity 110 and the execution result the acquisition task received from the acquisition entity) in the server 120. The reference map acquiring module 122 may obtain data from the management module 121, and generate the reference map 130 for the acquisition area based on the data. For example, the reference map 130 may serve as the basis for crowdsourced map production. Although it is shown in FIG. 1 that, the reference map 130 is generated by the server 120, in at least one embodiment, the reference map 130 may also be obtained from other sources.

At block 220, the server (e.g., the management module 120) divides the acquisition area into a plurality of sub-areas based on the reference map.

Figure 3:
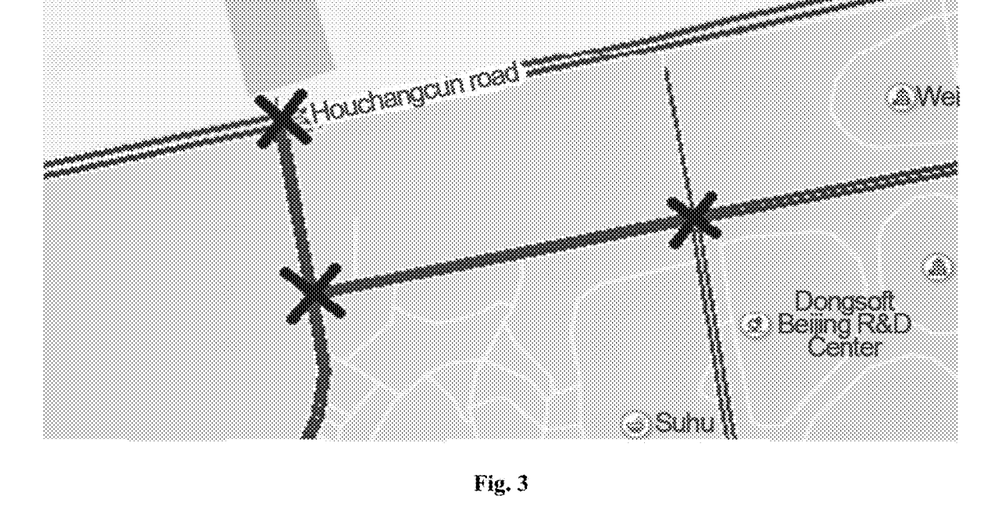
FIG. 3 is a schematic diagram of a partition generated based on a road element according to an embodiment of the present disclosure.
Figure 4:
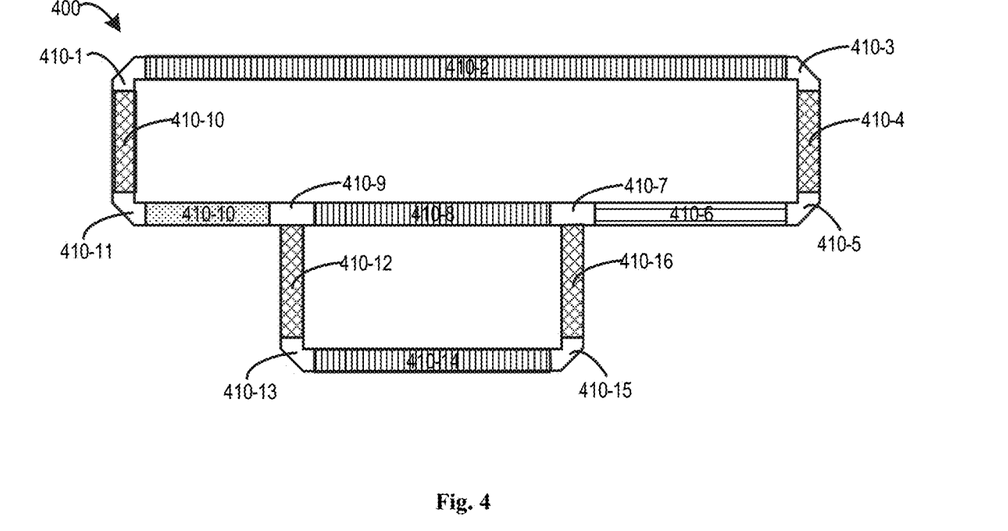
FIG. 4 is a schematic diagram of dividing an acquisition area into a plurality of sub-areas according to an embodiment of the present disclosure.

In at least one embodiment, the server 120 may recognize a road element of the reference map. For example, examples of the road element may include, but are not limited to, the lane line, the junction, and the like. The server 120 may divide the acquisition area into the plurality of sub-areas based on the recognized road element In at least one embodiment, for example, when the server 120 recognizes the interaction, the branch road or the path leading into the main road in the reference map, the server 120 may generate a partition at these road elements. Alternatively, in at least one embodiment, for example, when the server 120 recognizes that the length of the road is greater than the predetermined threshold, the server 120 may also generate the partition in the road. FIG. 3 shows an example of generating a partition based on the road element in the reference map. In FIG. 3, the partition is indicated by the symbol "X". Furthermore, the server 120 may divide the acquisition area into a plurality of polygonal areas based on the generated partition and the road boundary. FIG. 4 is a schematic diagram of dividing an acquisition area into a plurality of sub-areas according to an embodiment of the present disclosure. As shown in FIG. 4, the acquisition area 400 can be divided into a plurality of polygonal areas 410-1 to 410-16.

In at least one embodiment, each of the plurality of sub-areas divided by the server 120 may include a driving path, i.e., each sub-area includes an entrance and an exit. Thus, when the acquisition entity passes through the polygonal area (i.e., entering from the entrance and exiting from the exit), it can be determined that the acquisition entity has passed all the roads in the polygonal area. In other words, when the acquisition entity is within the polygonal area, it can be determined that the map acquisition for the polygonal area has been completed. Instead, when the polygonal area includes multiple roads, there may be multiple driving paths. In this case, even when the acquisition entity falls within the polygonal area, the acquisition entity may only pass through one of the driving paths, thus it cannot determine whether it covers all the paths in the polygonal area.

At block 230, the server 120 (e.g., the management module 121) generates a plurality of acquisition tasks corresponding to the plurality of sub-areas.

In an embodiment, each of the plurality of acquisition tasks is configured to acquire a map of each of the plurality of sub-areas.

At block 240, the server 120 (e.g., the management module 121) assigns each of the plurality of acquisition tasks to an acquisition entity, to enable the acquisition entity to acquire the map of each of the plurality of sub-areas.

In at least one embodiment, for example, the server 120 may assign each of the plurality of acquisition tasks to at least one acquisition entity corresponding to the acquisition task. For example, the acquisition task may specify the range of its corresponding sub-area (e.g., coordinates of respective vertices of the polygonal area). Alternatively, in an embodiment, for example, the server 120 may not specify the correspondence between the acquisition task and the acquisition entity, and broadcast the plurality of acquisition tasks to all acquisition entities. In this case, each acquisition entity may determine the acquisition task to be performed based on its location.

Figure 5:
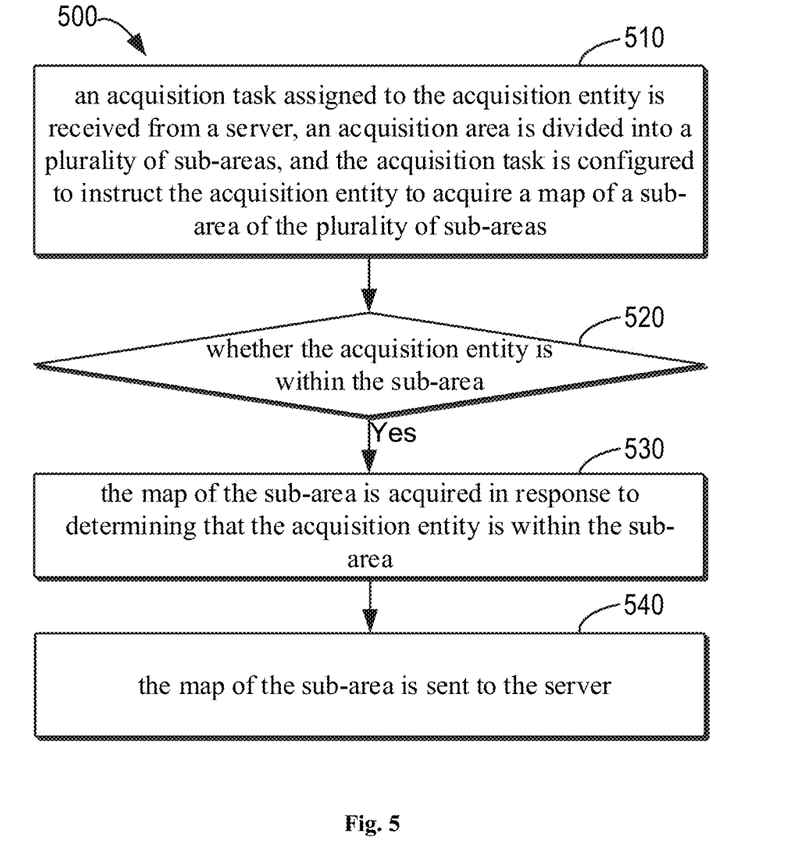
FIG. 5 is a flow chart of a method for acquiring a map according to an embodiment of the present disclosure.

FIG. 5 is a flow chart of a method 500 for acquiring a map according to an embodiment of the present disclosure. For example, the method 500 may be performed by the acquisition entity shown in FIG. 1. The various acts of the method 500 will be described in detail below with reference to FIG. 1. It should be understood that, the method 500 may also include additional acts not shown and/or acts that can be omitted, the scope of the present disclosure is not limited.

At block 510, the acquisition entity 110 acquires an acquisition task assigned to it from the server 120.

In an embodiment, the acquisition task may be configured to instruct the acquisition entity 110 to acquire a map of a sub-area of the plurality of sub-areas. For example, the acquisition task may specify the range of its corresponding sub-area (e.g., coordinates of respective vertices of the polygonal area).

At block 520, in response to receiving the acquisition task, the acquisition entity 110 determines whether it is within the sub-area specified by the acquisition task.

In an embodiment, for example, the acquisition entity 110 can determine its location (also referred to herein as a "first location") based on the GPS positioning module installed thereon. Since the acquisition task can specify the range of its corresponding sub-area, the acquisition entity 110 can determine the number of intersections at which a line connecting from another location (also referred to herein as a "second location") outside the sub-area to the first location intersects a perimeter of the sub-area. When the number of intersections is even, it is determined that the acquisition entity is not within the sub-area. When the number of intersections is odd, it is determined that the acquisition entity is within the sub-area.

Figure 6:
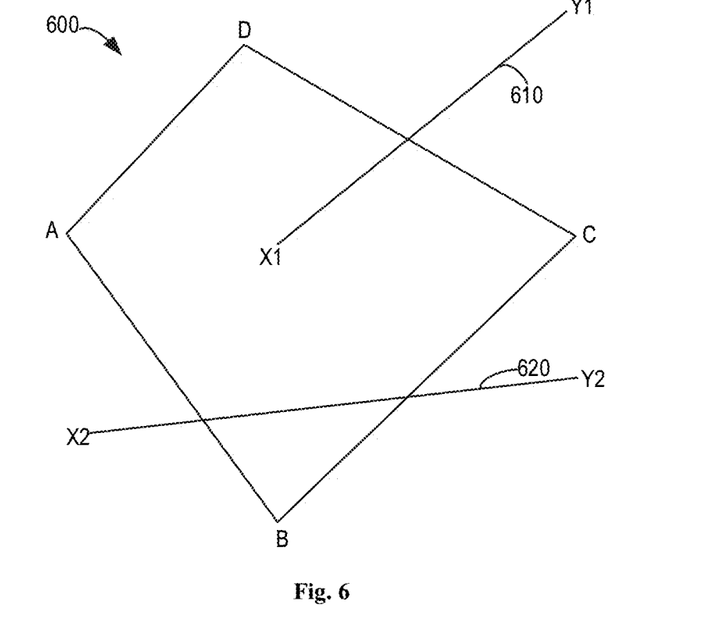
FIG. 6 is a schematic diagram of determining whether an acquisition entity is within a sub-area of an acquisition area according to an embodiment of the present disclosure.

FIG. 6 is a schematic diagram of determining whether an acquisition entity is within a sub-area of an acquisition area according to an embodiment of the present disclosure. As shown in FIG. 6, for example, a sub-area of the acquisition area is represented by a quadrilateral 600 having vertices of A, B, C, and D, respectively. When the current position of the acquisition entity is at point X1, since the number of intersections at which the line 610 connecting from the other position Y1 outside the quadrilateral 600 to X1 intersects the quadrilateral 600 is odd (i.e., one intersection), it can be determined that the acquisition entity is within the quadrilateral 600. When the current position of the acquisition entity is at point X2, since the number of intersections at which the line 620 connecting from the other position Y2 outside the quadrilateral 600 to X2 intersects the quadrilateral 600 is even (i.e., two intersections), it can be determined that the acquisition entity is not within the quadrilateral 600.

At block 530, the acquisition entity 110 acquires the map of the sub-area in response to determining that the it is within the sub-area.

Figure 7:
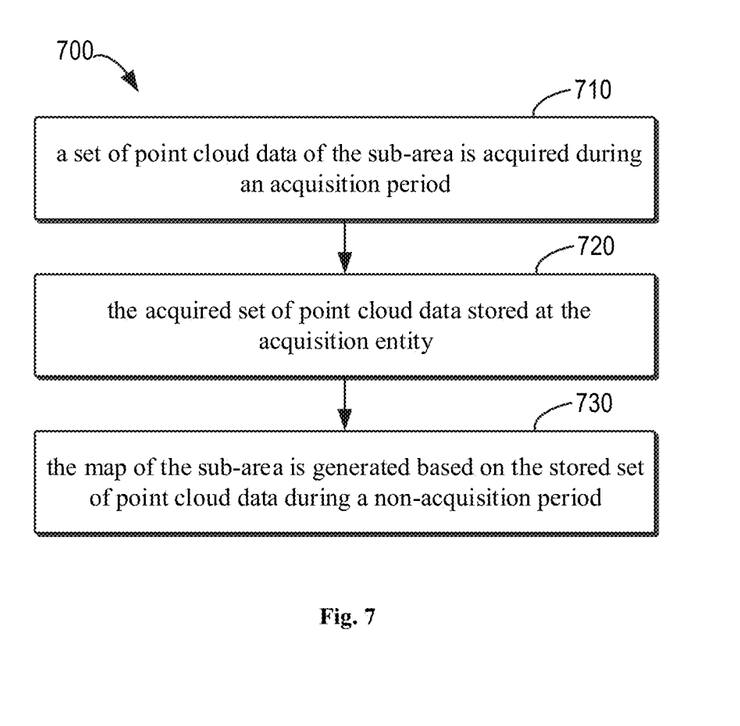
FIG. 7 is a flow chart of an example method for acquiring a map of a sub-area according to an embodiment of the present disclosure.

For example, FIG. 7 is a flow chart of an example method 700 for acquiring a map of a sub-area according to an embodiment of the present disclosure, the method 700 may be implemented as an example of block 530 shown in FIG. 5, and may be executed by the acquisition entity 110.

At block 710, the acquisition entity 110 acquires a set of point cloud data of the sub-area during an acquisition period.

In at least one embodiment, the acquisition entity 110 can acquire the multiple frames of point cloud data of the sub-area by using the lidar mounted thereon. In at least one embodiment, the acquisition period in which data may be collected can be preconfigured. For example, the acquisition period may be daytime, and nighttime may be the non-acquisition period. In an embodiment, the acquisition period may be determined based on the operation mode of the acquisition entity. For example, it may be the acquisition period when the acquisition entity is in the driving mode, and it may be the non-acquisition period when the acquisition entity stops driving or is in the charging mode.

At block 720, the acquisition entity 110 stores the acquired set of point cloud data at the acquisition entity.

The acquisition entity 110 may store the acquired point cloud data in its storage device. In at least one embodiment, the point cloud data for each sub-area may be stored only once. In other words, when the acquisition entity 110 reenters the sub-area after leaving it, the acquired data will not be stored, thereby saving the storage space of the acquisition entity. Alternatively, in an embodiment, the point cloud data for each sub-area may be stored multiple times at the acquisition entity. For example, the acquisition entity 110 may be configured with the predetermined parameter indicating the number of times the data of a sub-area is stored in a day (e.g., the data for a sub-area is acquired and stored 3 times in a day). The acquisition entity 110 can control the number of times the acquired data is stored based on the predetermined parameter.

At block 730, the acquisition entity 110 generates the map of the sub-area based on the stored set of point cloud data during the non-acquisition period.

In at least one embodiment, the non-acquisition period may be pre-configured. For example, the acquisition period may be daytime, and nighttime may be the non-acquisition period. In an embodiment, the acquisition period may be determined based on the operation mode of the acquisition entity. For example, it may be the acquisition period when the acquisition entity is in the driving mode, and it may be the non-acquisition period when the acquisition entity stops driving or is in the charging mode.

In at least one embodiment, the acquisition entity 110 may generate the point cloud map of the sub-area based on the stored point cloud data during the non-acquisition period. For example, the acquisition entity 110 may generate the locally smoothed point cloud map based on the stored multiple frames of point cloud data by using simultaneous localization and mapping (SLAM) technology. For example, the registration of point cloud may be achieved by determining the corresponding poses (also referred to herein as the "first set of poses") of the acquisition entity 110 when the acquisition entity 110 acquires each frame of point cloud of the multiple frames of point cloud.

The pose described herein may refer to the position and orientation of the object in a coordinate system. For example, in the 2D (two-dimensional) coordinate system, the pose of the object can be represented by 2D coordinates and the heading angle. In the 3D (three-dimensional) coordinate system, the pose of the object can be represented by 3D coordinates, the pitch angle, the heading angle and the rotation angle.

In at least one embodiment, there may be overlap in the area corresponding to the adjacent two frame of point cloud acquired by the acquisition entity 110. In this case, the pose transformation between the two poses of the lidar corresponding to the two frame of point cloud can be determined by matching the adjacent two frame of point cloud.

It is assumed that the two frame of point cloud to be matched is referred to as a point cloud pair, which may include the source point cloud and the target point cloud. $X_i^1$ denotes the target pose (for example, the pose of the lidar on the acquisition entity when capturing the target point cloud)

corresponding to the target point cloud in the $i^{th}$ point cloud pair, $X_i^2$ denotes the source pose (for example, the pose of the lidar on the acquisition entity when capturing the source point cloud) corresponding to the source point cloud in the $i^{th}$ point cloud pair. The point cloud matching is to translate and rotate the source pose of the source point cloud to obtain the target pose of the target point cloud, such that the source point cloud and the target point cloud can match. $\Delta p_i$ denotes the adjustment quantity between the source pose and the target pose of the $i^{th}$ point cloud pair.

In at least one embodiment, for example, the residual between the target point cloud obtained by the source point cloud through the pose transformation of the lidar and the actually collected target point cloud can be determined, and the pose adjustment quantity $\Delta p_i$ of the lidar can be determined by continuously optimizing the pose of the lidar to minimize the residual. In this way, the pose adjustment quantity of each point cloud pair can be determined. Moreover, the pose adjustment quantity can be used as the constraint for global optimization, to determine the pose of the acquisition entity 110 corresponding to each frame point cloud.

In at least one embodiment, the pose of the lidar corresponding to each frame point cloud may be determined by the following objective function.

$$\{X\} \leftarrow \operatorname{argmin}\left\{\sum_i \left\|(\Delta p_i \cdot x_i^2 - x_i^1)_{par} + (\Delta \hat{p}_i \cdot x_i^2 - x_i^1)_{par}\right\|^2\right\} \quad \text{formula (1)}$$

$\Delta \hat{p}_i$ represents the priori pose adjustment quantity provided by the GPS module and the inertial measurement unit on the acquisition entity 110, $X_i^1$ denotes the target pose corresponding to the target point cloud in the $i^{th}$ point cloud pair to be solved, $X_i^2$ denotes the source pose corresponding to the source point cloud in the $i^{th}$ point cloud pair to be solved. By minimizing the objective function in formula (1), the set $\{X\}$ of the pose of the lidar corresponding to each frame point cloud can be solved.

In this manner, the acquisition entity 110 can generate the point cloud map of the sub-area based on the stored point cloud data during the non-acquisition period.

In at least one embodiment, the acquisition entity 110 may convert the 3D point cloud map to the 2D reflection value map by projecting the point cloud map into a coordinate system (e.g., a Universal Transverse Mercator (UTM) coordinate system). In an embodiment, the reflectance value map may be used as the basis for map accuracy verification, map return, map conflation and update, or the like.

In an embodiment, for example, the coordinate system (e.g., the UTM coordinate system) may be divided into a plurality of map nodes of a fixed size, and each map node covers a preset range. Thus, when the size of the map node is known, the map node where a point is located can be determined based on its coordinates in the coordinate system.

Since the point cloud map includes a series of points, when all the points are mapped to the map nodes, the data volume of the generated reflection value map may be huge. Thus, in an embodiment, each map node can be subdivided into a preset number of cells (e.g., 1024×1024). Then, the point cloud data falling into the same cell can be aggregated, such that only the aggregated data is stored for each cell. Thus, regardless of the number of points in the point cloud map, the data volume stored for each map node is fixed.

It is assumed that the coordinate of the laser point reflected by the laser emitted by the acquisition entity 110 after being irradiated onto the object is $P=(x, y, z)^T$, based on x and y, the position of the laser point in the coordinate system (e.g., the UTM coordinate system) can be determined, z denotes the height value of the laser point. For each laser point, the cell of the map node it falls into can be determined based on x and y. For each cell, data (such as the mean and variance of the reflection value, the mean and variance of the height value, and/or the number of laser points) of the laser point falling therein can be stored. Thus, the point cloud map acquired by the acquisition entity 110 can be converted into the reflection value map.

At block 540, the acquisition entity 110 sends the map of the sub-area to the server 120. In at least one embodiment, the acquisition entity 110 can determine the accuracy of the map of sub-area, and send the map of the sub-area to the server 120 in response to the accuracy being within the predetermined range.

In at least one embodiment, the accuracy of the map may be verified based on the reflection value map. For example, the accuracy of the generated map may be determined performing real-time positioning simulation based on the generated reflection value map during simulating the autonomous driving, and matching the result (such as a set of poses) of the real-time positioning simulation with the first set of poses.

Figure 8:
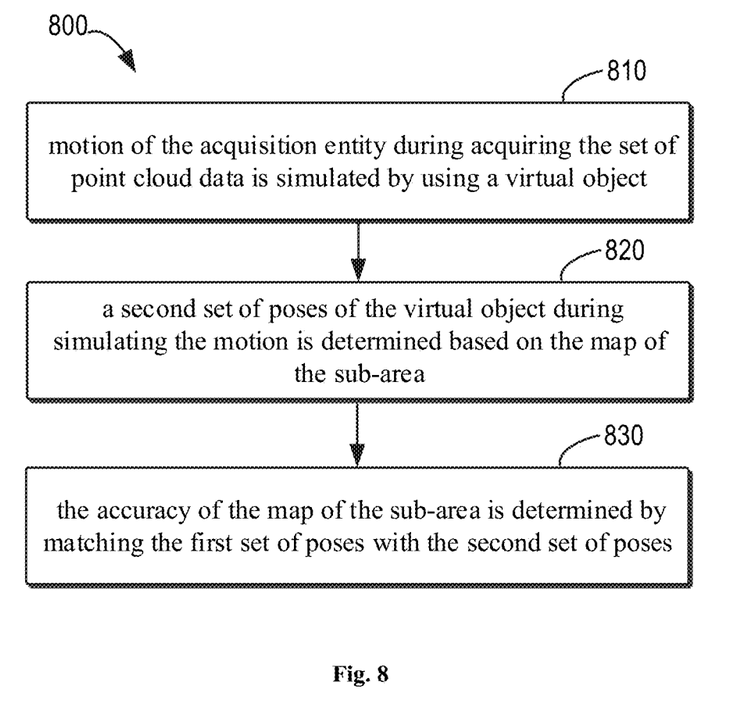
FIG. 8 is a flow chart of an example method for verifying map accuracy according to an embodiment of the present disclosure.

FIG. 8 is a flow chart of a method 800 for verifying map accuracy according to an embodiment of the present disclosure. For example, the method 800 may be implemented as an example of block 540 shown in FIG. 5, and may be executed by the acquisition entity 110.

At block 810, motion of the acquisition entity 110 during acquiring the set of point cloud data is simulated by using a virtual object.

For example, in software, a virtual vehicle may be utilized to simulate the motion of the acquisition entity 110 during performing the acquisition task in the sub-area.

At block 820, a second set of poses of the virtual object during simulating the motion of the acquisition entity 110 is determined based on the map of the sub-area.

In at least one embodiment, the current location of the virtual vehicle may be determined based on the initial predicted location of the virtual vehicle, so as to be loaded to the reflection value map. Then, matching may be performed based on the laser reflection value and the height value of the point cloud scanned by the virtual vehicle and the reflection value and the height value of the reflection value map. For example, when matching, the matching probability of each possible location in a preset range near the initial predicted location may be calculated by centering on the initial predicted position. The probability distribution of the positioning results may be updated by using a histogram filter, such that the precise location of the virtual vehicle can be determined based on the probability distribution. The initial predicted position of the virtual vehicle can be determined by the last positioning result and the vehicle motion information given by the inertial navigation device. In the initial case (e.g., no positioning result is determined), the initial predicted position may be obtained based on the GPS signal of the acquisition entity, which may have an error of 2-5 meters. After the initial position is predicted, the final positioning result of the virtual vehicle can be determined by the map matching At block 830, the accuracy of the generated map for respective sub-area is determined by matching the first set of poses of the acquisition entity with the second set of poses of the virtual vehicle.

For example, the greater the location difference between the first set of poses and the second set of poses is, the lower the accuracy of the generated map is. The smaller the location difference between the first set of poses and the second set of poses is, the higher the accuracy of the generated map is. In other words, the accuracy of the generated map can be determined by the accuracy of the results of the simulated positioning.

In at least one embodiment, the acquisition entity 110 may transmit the map of the corresponding sub-area to the server 120 in response to the accuracy of the map of the sub-area being within a predetermined range. In an embodiment, the predetermined range may be determined based on empirical values. For example, examples of the predetermined range include, but are not limited to, the mean value of the location difference between the first set of poses and the second set of poses is less than 5 cm, the maximum location difference between the first set of poses and the second set of poses is no more than 30 cm, or 99.9% of the location differences between the first set of poses and the second set of poses is less than 10 cm.

In at least one embodiment, the acquisition entity 110 may transmit the reflection value map of the sub-area to the server 120 in response to the accuracy of the map of the sub-area being within the predetermined range, such that the server 120 can update the reference map of the acquisition area based on the reflection value map of the corresponding sub-area.

At block 250, the server 120 (e.g., the map updating module 123) updates the reference map (also referred to herein as map conflation) based on the map of each of the plurality of sub-areas in response to receiving the map of each of the plurality of sub-areas from the acquisition entity 110.

In at least one embodiment, the combination of the map of the sub-area with the reference map may be performed based on reflection value map. For example, the map conflation may be performed based on each map node in the reflection value map, and each map node may include a preset number of cells (e.g., 1024×1024). In an embodiment, the data (such as the mean and variance of the reflected value, the mean and variance of the height value, and/or the number of laser points) of each cell in the reference map may be updated using the data of each cell in the reflection value map of the sub-area received from the acquisition entity 110.

In at least one embodiment, the server 120 may further verify the accuracy of the updated reference map. For example, during simulating the driving process of each acquisition entity, the server 120 may determine the accuracy of the updated reference map by simulating the real-time positioning based on the updated reference map. These acts are similar to the method 800 described above in connection with FIG. 8, and will not be described in detail herein.

With the technical solution of the embodiments of the present disclosure, the low-cost and high-precision map production can be achieved by using crowdsourcing mode, the redundant data can be removed from the massively collected data, and only necessary data can be stored. Moreover, the technical solution can use the limited resources at the acquisition entity for map production and accuracy verification, thereby reducing the occupation of the transmission bandwidth between the acquisition entity and the server, and improving the map production efficiency.

Figure 9:
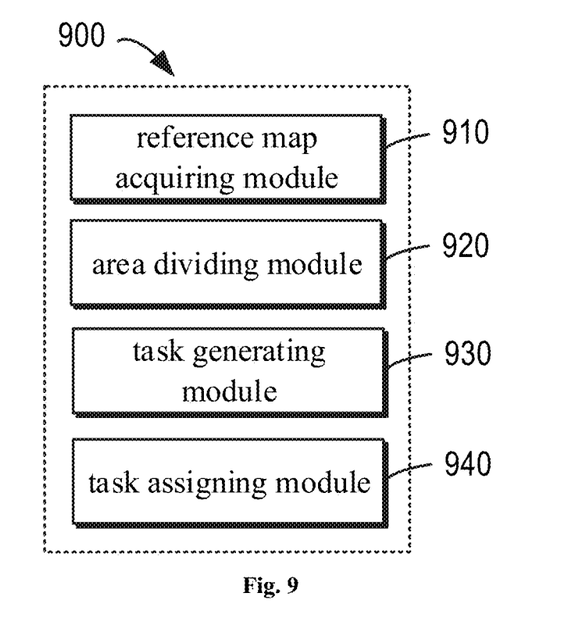
FIG. 9 is a block diagram of a device for acquiring a map according to an embodiment of the present disclosure.

FIG. 9 is a block diagram of a device 900 for acquiring a map according to an embodiment of the present disclosure. The device 900 may be implemented, for example, as the server 120 shown in FIG. 1.

As shown in FIG. 9, the device 900 includes a reference map acquiring module 910, an area dividing module 920, a task generating module 930, and a task assigning module 940. The reference map acquiring module 910 is configured to acquire a reference map of an acquisition area. The area dividing module 920 is configured to divide the acquisition area into a plurality of sub-areas based on the reference map. The task generating module 930 is configured to generate a plurality of acquisition tasks corresponding to the plurality of sub-areas. Each of the plurality of acquisition tasks is configured to acquire a map of each of the plurality of sub-areas. The task assigning module 940 is configured to assign each of the plurality of acquisition tasks to an acquisition entity, to enable the acquisition entity to acquire the map of each of the plurality of sub-areas.

In an embodiment, the device 900 further includes a map updating module. The map updating module is configured to update the reference map based on the map of each of the plurality of sub-areas in response to receiving the map of each of the plurality of sub-areas from the acquisition entity.

In an embodiment, each of the plurality of sub-areas is a polygonal area.

In an embodiment, each of the plurality of sub-areas includes a driving path, and the driving path includes an entrance and an exit.

In an embodiment, the area dividing module 920 includes an element recognizing unit and an area dividing unit. The element recognizing unit is configured to recognize a road element of the reference map. The area dividing unit is configured to divide the acquisition area into the plurality of sub-areas based on the recognized road element.

In an embodiment, the road element includes at least one of a lane line, and a junction.

Figure 10:
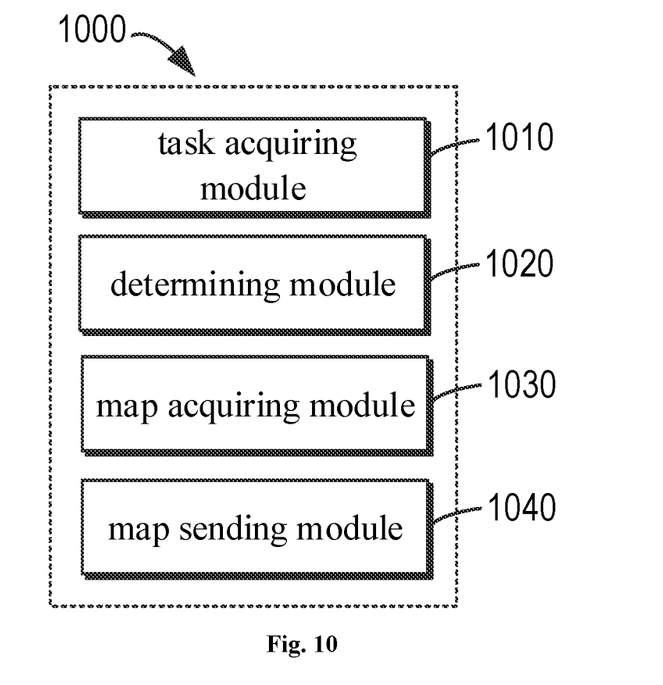
FIG. 10 is a block diagram of a device for acquiring a map according to an embodiment of the present disclosure.

FIG. 10 is a block diagram of a device 1000 for acquiring a map according to an embodiment of the present disclosure. The device 1000 may be implemented, for example, as the acquisition entity 110 shown in FIG. 1.

As shown in FIG. 10, the device 1000 includes a task acquiring module 1010, a determining module 1020, a map acquiring module 1030, and a map sending module 1040. The task acquiring module 1010 is configured to acquire an acquisition task assigned to the acquisition entity from a server. An acquisition area is divided into a plurality of sub-areas, and the acquisition task is configured to instruct the acquisition entity to acquire a map of a sub-area of the plurality of sub-areas. The determining module 1020 is configured to determine whether the acquisition entity is within the sub-area. The map acquiring module 1030 is configured to acquire the map of the sub-area in response to determining that the acquisition entity is within the sub-area. The map sending module 1040 is configured to send the map of the sub-area to the server.

In an embodiment, the determining module 1020 includes a first determining unit, a second determining unit, and a third determining unit. The first determining unit is configured to determine a first location where the acquisition entity is located. The second determining unit is configured to determine the number of intersections at which a line connecting from a second location outside the sub-area to the first location intersects a perimeter of the sub-area. The third determining unit is configured to determine that the acquisition entity is not within the sub-area in response to the number of intersections being even; and determine that the acquisition entity is within the sub-area in response to the number of intersections being odd.

In an embodiment, the map acquiring module 1030 includes a data acquiring unit, a data storing unit, and a map generating unit. The data acquiring unit is configured to acquire a set of point cloud data of the sub-area during an acquisition period in response to determining that the acquisition entity is within the sub-area. The data storing unit, configured to store the acquired set of point cloud data at the acquisition entity. The map generating unit, configured to generate the map of the sub-area based on the stored set of point cloud data during a non-acquisition period.

In an embodiment, the map generating unit is configured to generate a point cloud map of the sub-area by determining a first set of poses of the acquisition entity when acquiring the set of point cloud data.

In an embodiment, the map generating unit is further configured to convert the point cloud map to a reflection value map by projecting the point cloud map into a coordinate system.

In an embodiment, the map sending module 1040 includes an accuracy determining unit, and a map sending unit. The accuracy determining unit is configured to determine an accuracy of the map of the sub-area. The map sending unit is configured to send the map of the sub-area to the server in response to the accuracy being within a predetermined range.

In an embodiment, the accuracy determining unit is configured to: simulate motion of the acquisition entity during acquiring the set of point cloud data by using a virtual object; determine a second set of poses of the virtual object during simulating the motion based on the map of the sub-area; and determine the accuracy of the map of the sub-area by matching the first set of poses with the second set of poses.

Figure 11:
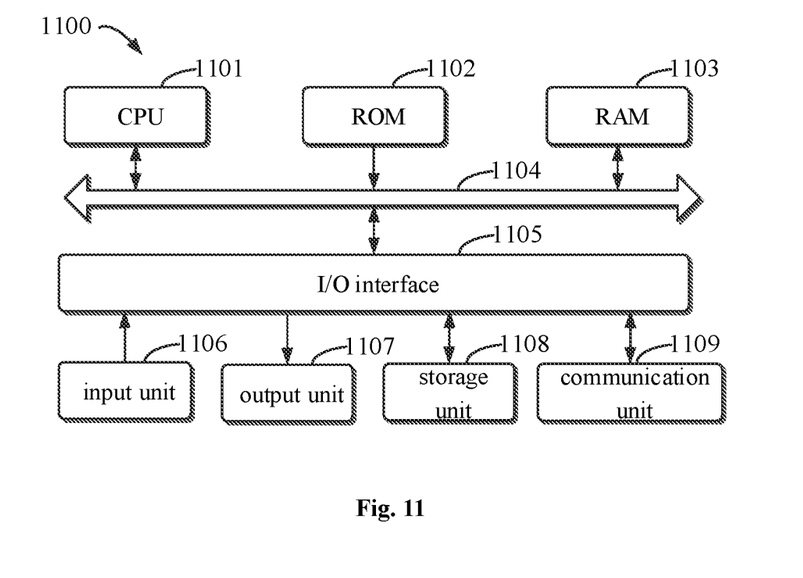
FIG. 11 is a block diagram of a computing device for implementing an embodiment of the present disclosure.

FIG. 11 is a schematic diagram of a device 1100 according to an embodiment of the present disclosure. The device 1100 may be configured to implement the acquisition entity 110 or the server 120 as shown in FIG. 1. As shown in FIG. 11, the device 1100 includes a central processing unit (CPU) 1101, a read only memory (ROM) 1102, and a random-access memory (RAM) 1103. The CPU 1101 can perform various appropriate operations and processes based on the computer program instructions stored in the ROM 1102 or computer program instructions loaded from the storage unit 1108 into the RAM 1103. The RAM 1103 may store various programs and data required for the operation of the device 1100. The CPU 1101, the ROM 1102 and the RAM 1103 may be connected to each other through a bus 1104. The input/output (I/O) interface 1105 may also be coupled to bus 1104.

A plurality of components in the device 1100 are coupled to the I/O interface 1105, including: the input unit 1106 such as a keyboard, mouse, etc., the output unit 1107 such as various types of displays, speakers, etc., the storage unit 1108 such as a disk, an optical disk or the like, and the communication unit 1109 such as a network card, a modem, a wireless communication transceiver, or the like. The communication unit 1109 allows device 1100 to exchange information/data with other devices over a computer network such as the Internet and/or various telecommunication networks.

The processing unit 1101 is configured to perform various methods and processes described above, such as methods 200, 500, 700, and/or 800. For example, in at least one embodiment, methods 200, 500, 700 and/or 800 may be implemented as computer software programs that are tangibly embodied in the machine readable medium, such as storage unit 1108. In at least one embodiment, part or all of the computer program may be loaded and/or installed on the device 1100 via ROM 1102 and/or the communication unit 1109. When a computer program is loaded into RAM 1103 and executed by CPU 1101, one or more steps of the methods 200, 500, 700, and/or 800 described above may be performed. Alternatively, in other embodiments, the CPU 1101 can be configured to perform the methods 200, 500, 700, and/or 800 by any other suitable means (e.g., by means of firmware).

The functions described above may be performed, at least in part, by one or more hardware logic components. For example, without any limitation, the exemplary type of the hardware logic component may include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the present disclosure may be written in any combination of one or more programming languages. The program code may be provided to a general-purpose computer, a special purpose computer or a processor or controller of other programmable data processing devices, such that the program code, when executed by the processor or controller, causes the functions/operations specified in the flowcharts and/or block diagrams to be implemented. The program code may be executed entirely on a machine, partially on a machine, partially on the machine as a separate package, partially on a remote machine, or entirely on a remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or Flash memory), an optical fiber, a compact disk-only memory (CD-ROM), an optical storage device, a magnetic storage device, or any suitable combination of the above.

In addition, although the operations are depicted in a particular order, it should be understood that such operations are required to be performed in the particular order shown or in the order, or that all illustrated operations should be performed to achieve the desired results. Multitasking and parallel processing may be advantageous in certain circumstances. Likewise, although several specific implementation details are included in the above discussion, these should not be construed as restrictions on the scope of the present disclosure. Certain features described in the context of individual embodiments may also be implemented in combination in a single implementation. Conversely, various features described in the context of a single implementation may also be implemented in a plurality of implementations, either individually or in any suitable sub-combination.

Although the present disclosure has been described in language specific to structural features and/or methodological acts, it is understood that the subject matter defined in the appended claims is not limited to the specific features or acts described. Instead, the specific features and acts described above are merely exemplary forms of implementing the claims.

What is claimed is:

1. A method for acquiring a map, applicable to a server, comprising:
receiving by the server, raw data for mapping in an acquisition area acquired by a plurality of sensors mounted on a first acquisition entity;
generating by the server, a reference map of the acquisition area based on the raw data;
dividing by the server, the acquisition area into a plurality of sub-areas based on the reference map;
generating by the server, a plurality of acquisition tasks corresponding to the plurality of sub-areas, wherein each of the plurality of acquisition tasks is configured to instruct each of a plurality of second acquisition entities to acquire a set of point cloud data of each sub-area to generate a map of each of the plurality of sub-areas;
assigning by the server, each of the plurality of acquisition tasks to each of the plurality of second acquisition entities;
receiving by the server, the map of each of the plurality of sub-areas sent by each of the plurality of second acquisition entities in response to determining that an accuracy of the map of each sub-area is within a predetermined range; and
performing by the server, map conflation based on the map of each of the plurality of sub-areas acquired by each of the plurality of second acquisition entities to update the reference map;
wherein the accuracy of the map of each sub-area is determined by:
simulating with a virtual object, motion of the second acquisition entity when acquiring the set of point cloud data;
determining a second set of poses of the virtual object when simulating the motion based on the map of the sub-area; and
matching the second set of poses with a first set of poses of the second acquisition entity when acquiring the set of point cloud data.

2. The method according to claim 1, wherein each of the plurality of sub-areas is a polygonal area.

3. The method according to claim 1, wherein each of the plurality of sub-areas comprises only one driving path, and the driving path comprises an entrance and an exit.

4. The method according to claim 1, wherein dividing the acquisition area into the plurality of sub-areas comprises:
recognizing a road element of the reference map; and
dividing the acquisition area into the plurality of sub-areas based on the recognized road element.

5. The method according to claim 4, wherein the road element comprises at least one of a lane line, and a junction.

6. A device for acquiring a map, applicable to a server, comprising:
one or more processors; and
a memory, configured to store one or more programs;
wherein when the one or more programs are executed by the one or more processors, causes the one or more processors to:
receive raw data for mapping in an acquisition area acquired by sensors on a first acquisition entity;
generate a reference map of an acquisition area based on the raw data;
divide the acquisition area into a plurality of sub-areas based on the reference map;
generate a plurality of acquisition tasks corresponding to the plurality of sub-areas, wherein each of the plurality of acquisition tasks is configured to instruct each of a plurality of second acquisition entities to acquire a set of point cloud data of each sub-area to generate a map of each of the plurality of sub-areas;
assign each of the plurality of acquisition tasks to each of the plurality of second acquisition entities;
receive the map of each of the plurality of sub-areas sent by each of the plurality of second acquisition entities in response to determining that an accuracy of the map of each sub-area is within a predetermined range; and
perform map conflation based on the map of each of the plurality of sub-areas acquired by each of the plurality of second acquisition entities to update the reference map;
wherein the accuracy of the map of each sub-area is determined by:
simulating with a virtual object, motion of the second acquisition entity when acquiring the set of point cloud data;
determining a second set of poses of the virtual object when simulating the motion based on the map of the sub-area; and
matching the second set of poses with a first set of poses of the second acquisition entity when acquiring the set of point cloud data.

7. The device according to claim 6, wherein each of the plurality of sub-areas is a polygonal area.

8. The device according to claim 6, wherein each of the plurality of sub-areas comprises only one driving path, and the driving path comprises an entrance and an exit.

9. The device according to claim 6, wherein the one or more processors further configured to:
recognize a road element of the reference map; and
divide the acquisition area into the plurality of sub-areas based on the recognized road element.

10. The device according to claim 9, wherein the road element comprises at least one of a lane line, and a junction.

11. A device for acquiring a map, applicable to an acquisition entity, comprising:
one or more processors; and
a memory, configured to store one or more programs;
wherein when the one or more programs are executed by the one or more processors, causes the one or more processors to:
acquire an acquisition task assigned to the acquisition entity from a server, wherein the acquisition area is divided into a plurality of sub-areas based on a reference map of the acquisition area, the reference map is generated by the server based on raw data acquired by a plurality of sensors, and the acquisition task is configured to instruct the acquisition entity to acquire a map of a sub-area of the plurality of sub-areas;
determine whether the acquisition entity is within the sub-area;
acquire a set of point cloud data of the sub-area to generate the map of the sub-area in response to determining that the acquisition entity is within the sub-area; and
send the map of the sub-area to the server in response to an accuracy of the map of the sub-area being within a predetermined range;

wherein the one or more processors are further configured to
simulate with a virtual object, motion of the acquisition entity when acquiring the set of point cloud data;
determine a second set of poses of the virtual object when simulating the motion based on the map of the sub-area; and
determine the accuracy by matching the second set of poses with a first set of poses of the acquisition entity when acquiring the set of point cloud data.

12. The device according to claim 11, wherein the one or more processors are further configured to:
determine a first location where the acquisition entity is located;
determine a number of intersections at which a line connecting from a second location outside the sub-area to the first location intersects a perimeter of the sub-area; and
determine that the acquisition entity is not within the sub-area in response to the number of intersections being even; and determine that the acquisition entity is within the sub-area in response to the number of intersections being odd.

13. The device according to claim 11, wherein the one or more processors are further configured to:
acquire the set of point cloud data of the sub-area during an acquisition period in response to determining that the acquisition entity is within the sub-area;
store the acquired set of point cloud data at the acquisition entity; and
generate the map of the sub-area based on the stored set of point cloud data during a non-acquisition period.

14. The device according to claim 13, wherein the one or more processors are further configured to:
generate a point cloud map of the sub-area by determining a first set of poses of the acquisition entity when acquiring the set of point cloud data;

wherein the first set of poses is determined by minimizing an objective function expressed by:

$$\{X\} \leftarrow \operatorname{argmin}\left\{\sum_i \left\|(\Delta p_i \cdot x_i^2 - x_i^1)_{pair} + (\Delta \overline{p}_i \cdot x_i^2 - x_i^1)_{pair}\right\|^2\right\}$$

where $\Delta \hat{p}_i$ represents priori pose adjustment quantity provided by a GPS module and an inertial measurement unit on the acquisition entity, $X_i^1$ denotes a target pose corresponding to target point cloud in the $i^{th}$ point cloud pair to be solved, $X_i^2$ denotes a source pose corresponding to source point cloud in the $i^{th}$ point cloud pair to be solved, and $\{X\}$ denotes a set of poses.

15. The device according to claim 14, wherein the one or more processors are further configured to:
convert the point cloud map to a reflection value map by projecting the point cloud map into a coordinate system.

16. The device according to claim 15, wherein the one or more processors are further configured to:
determine an initial predicted location of the virtual object based on GPS signals of the acquisition entity;
calculate a matching probability of each possible location in a preset range centering on the initial predicted location, in which the matching probability indicates a probability based on a matching between a laser reflection value and a height value of each point cloud scanned by the virtual object and a reflection value and a height value included in the reflection value map;
determine a precise location of the virtual vehicle based on a distribution of matching probabilities.

* * * * *